United States Patent [19]

Golosman et al.

[11] 3,979,336
[45] Sept. 7, 1976

[54] CATALYST FOR DISSOCIATION OF AMMONIA AND METHOD OF PREPARING SAME

[76] Inventors: Evgeny Zinovievich Golosman, ulitsa L. Tolstogo, 46/1, kv. 1; Viktor Stanislavovich Sobolevsky, ulitsa Moskovskaya, 2/14, kv. 5; Viktor Petrovich Lytkin, ulitsa Trudovye rezervy, 70b, kv. 95; Nikolai Nikitovich Axenov, ulitsa Druzhby, 19a, kv. 26; Alexandra Ivanovna Golovkova, ulitsa Komsomolskaya, 6, kv. 35, all of Novomoskovsk, Tulskoi oblasti; Yakov Anatolievich Peker, ulitsa Admirala Lazareva, 12, kv. 20; Dmitry Ivanovich Zinchenko, prospekt Mira, 9, kv. 54, both of Lipetsk; Sergei Ivanovich Ruzinsky, poselok 25-letia Khimkombinata, ulitsa Azotchikov, 4, Novomoskovsk, Tulskoi oblasti, all of U.S.S.R.

[22] Filed: Dec. 10, 1974

[21] Appl. No.: 531,282

[52] U.S. Cl. .......................... 252/455 R; 252/459; 252/374
[51] Int. Cl.² .................... B01J 29/06; B01J 29/10; C01B 2/02
[58] Field of Search ............. 252/455 R, 466 J, 374, 252/459; 423/351

[56] References Cited
UNITED STATES PATENTS

| | | | |
|---|---|---|---|
| 1,771,130 | 7/1930 | Larson | 252/466 J |
| 1,845,785 | 2/1932 | Dodge | 423/351 X |
| 1,988,781 | 1/1935 | Burke | 252/374 |
| 2,512,608 | 6/1950 | Buchmann | 252/466 J |
| 3,755,199 | 8/1973 | Stefanescu et al. | 252/455 R |

OTHER PUBLICATIONS

Sobolevskii et al. "Chemical Abstracts" vol. 69 (1968) p. 90222a.

*Primary Examiner*—Carl F. Dees
*Attorney, Agent, or Firm*—Fleit & Jacobson

[57] ABSTRACT

A catalyst for dissociation of ammonia consists of iron oxides, aluminium oxide, calcium oxide, silicon dioxide, and potassium oxide. The components are present in the catalyst in the following quantities in per cent by weight:

| | |
|---|---|
| iron oxides | 87.8 – 48.5 |
| aluminium oxide | 10 – 48 |
| calcium oxide | 1.35 – 2.15 |
| silicon dioxide | 0.35 – 0.4 |
| potassium oxide | 0.5 – 0.6 |

The catalyst is prepared by mixing 87.8 – 48.85 per cent by weight of iron oxides with 1.35 – 2.15 percent by weight of calcium oxide, 0.35 – 0.4 per cent by weight of silicon dioxide, and 0.5 – 0.6 per cent by weight of potassium oxide. The prepared mixture is melted at a temperature of 1600° – 1700°C with subsequent cooling to a temperature of not above 100°C. The cooled mass is crushed and mixed with 10 – 48 per cent by weight of aluminium oxide. The obtained mixture is melted again at a temperature of 1600° – 1700°C with subsequent cooling to a temperature not above 40°C, and the cooled mass is finally crushed.

2 Claims, No Drawings

CATALYST FOR DISSOCIATION OF AMMONIA AND METHOD OF PREPARING SAME

This invention relates to a catalyst for dissociation of ammonia and the method of preparing same.

The catalyst can be used in dissociation of ammonia with the purpose of preparing a nitrogen-hydrogen mixture.

This mixture, consisting of nitrogen and hydrogen taken at various ratios, is a shielding medium used for hot treatment of some alloys, for bright annealing, tempering, preparing electrotechnical steels, and for other applications.

Shielding media must meet certain requirements. For example, the nitrogen-hydrogen mixture used for heat treatment of transformer laminations should not contain more than 0.02 – 0.03 percent by volume of residual ammonia. Atomic nitrogen that is formed during dissociation of residual ammonia saturates steel with formation of aluminium nitride and silicon nitride which give brittleness to steel and impair its magnetic properties.

Known in the prior art are catalysts for dissociation of ammonia, containing nickel and iron as active components. These catalysts are manufactured in the form of tablets, circles, or particles of certain fraction.

Catalysts used in the manufacture of shielding media in industry should have high thermal stability, activity, mechanical strength, long service life, and should meet the requirements of high volumetric velocities of ammonia passage.

Best of the known catalysts provide for dissociation of ammonia at relatively high volumetric velocities, ranging from 1000 to 2000 hour$^{-1}$, at temperatures of 850°–900°C and residual content of ammonia in the obtained nitrogen-hydrogen mixture below 0.1 percent by volume. These catalysts possess high mechanical strength and thermal stability (to 950°C).

The components used for preparing catalysts containing nickel and iron possess low thermal conductivity. At the same time, the reaction of ammonia decomposition is an endothermic process and if insufficient quantities of heat are supplied from an external source, some ammonia may pass through the reaction zone without being decomposed, which is particularly marked at high production capacity of the equipment.

Ammonia synthesis catalysts, iron Raschig rings, and iron ore, are only seldom used for dissociation of ammonia due to their low activity. For example, even the best industrial catalysts used for the synthesis of ammonia fail to prepare nitrogen-hydrogen mixtures containing ammonia in the required quantities. (Actually, the ammonia content of the mixture obtained with these catalysts is as high as 0.3 – 0.5 percent by volume). The attempt to increase the process temperature from 650°–700°C to 800°–850°C proves ineffective since the catalyst life markedly shortens, and the catalyst is fully sintered. And since it is impossible to replace the sintered catalyst, the whole reactor has to be changed.

The low activity of the catalyst is responsible for the low degree of ammonia dissociation which in many cases requires additional purification of the obtained nitrogen-hydrogen mixture from ammonia.

Known in the prior art is a catalyst for dissociation of ammonia containing oxides of iron, aluminium oxide, and oxide of nickel and of magnesium.

This catalyst is prepared by impregnating a calcined carrier, which is an activated aluminium oxide, with an aqueous solution containing nitrates of iron, nickel and magnesium. The impregnated carrier is then dried at a temperature of 100°–120°C, and calcined at a temperature of 350°C. During the calcining process, the temperature is raised in steps, namely, from 100°–120°C the temperature is raised to 350°C at a rate not exceeding 50°C per hour, and the carrier is kept at this temperature of 350°C for not less than 2 hours. The catalyst is used for dissociation of ammonia. This method is realized by passing gaseous ammonia through the catalyst bed at a temperature of 600°C at a volumetric velocity of 400 hour$^{-1}$, the residual content of ammonia in the obtained nitrogen-hydrogen mixture being 0.4 percent by volume.

Thus, the known method for dissociation of ammonia with the use of the known catalyst is carried out at low temperature, low volumetric velocity, and the obtained nitrogen-hydrogen mixture contains rather great quantities of ammonia. If the process temperatures are raised to 850°–950°C, mechanical strength and thermal stability of the catalyst are drastically impaired. The low thermal conductivity of the catalyst is also responsible for an inadequate temperature distribution over the catalyst bed which in turn accounts for the high residual content of ammonia in the obtained nitrogen-hydrogen mixture, which is especially marked at high temperatures.

The object of the invention is to provide a catalyst for dissociation of ammonia possessing high activity, high mechanical strength, increased thermal stability, high thermal conductivity, which can be prepared from readily available raw materials.

In accordance with this and other objects, the invention consists in that the catalyst for dissociation of ammonia consists of oxides of iron, aluminium oxide, calcium oxide, silica, and potassium oxide, these components being present in the catalyst in the following quantities in percent by weight:

| | |
|---|---|
| iron oxides | 87.8 – 48.85 |
| aluminium oxide | 10 – 48 |
| calcium oxide | 1.35 – 2.15 |
| silicon dioxide | 0.35 – 0.4 |
| potassium oxide | 0.5 – 0.6 |

According to the invention, the method for preparing the catalyst consists in mixing together 87.8 – 48.85 percent by weight of iron oxides 1.35 – 2.15 of percent by weight of calcium oxide, 0.35 – 0.4 percent by weight of silicon dioxide, and 0.5 – 0.6 percent by weight of potassium oxide. The obtained mixture is fused at a temperature of 1600° – 1700°C with subsequent cooling to a temperature not over 100°C. The cooled mixture is crushed, and mixed with 10 – 48 percent by weight of aluminium oxide. The obtained mixture is melted again at a temperature of 1600° – 1700°C, with subsequent cooling to a temperature of not over 40°C, and the cooled mass is crushed.

The proposed method ensures increased mechanical strength of the catalyst, which is 6–8 times as great compared with that inherent in the known catalyst containing oxides of iron, aluminium oxide, nickel oxide and magnesium oxide. Moreover, the components are uniformly distributed throughout the entire mass of the catalyst.

Owing to the presence of a great a share of aluminium oxide (10 – 48 percent by weight) in the catalyst, iron is not sintered at high temperatures (700° – 1000°C). Also the obtained catalyst has high activity which ensures preparation of nitrogen-hydrogen mixtures containing as little ammonia as 0.1 percent and even lower (down to 0.02 – 0.017 percent by volume).

Owing to the high iron content of the catalyst (87.8 – 48.85 percent by weight), its thermal conductivity is high too, and in this connection the temperature in the catalyst bed is much more uniform, which in turn improves the conditions under which the catalyst is used during dissociation of ammonia.

With uniform distribution of temperature through the vertical section of the catalyst bed and with preheating of the gaseous ammonia to temperatures not below 400°–500°C, it is possible to prepare nitrogen-hydrogen mixtures containing as little ammonia as 0.1 percent by volume (and even less) at volumetric velocities of the gaseous ammonia of 250 – 30,000 hour$^{-1}$. The optimum working temperature of the process with the proposed catalyst is 850°C.

The catalyst shows stable operation at overheating to temperatures from 1000° to 1100°C. The catalyst has been tried under industrial conditions and proved to retain its activity and mechanical integrity throughout the whole of this period.

The method for preparing the proposed catalyst is as follows.

Oxides of iron, for example, magnetite, calcium oxide, silicon dioxide, and potassium oxide, taken in the quantities corresponding to the required composition of the catalyst, are mixed thoroughly in a ball mill, the prepared mixture is loaded into a furnace between water-cooled electrodes, and electric current of the order of 30 – 60 volt is passed through the electrodes at the current intensity of 400–600 A. The mixture melts in the resistance furnace at a temperature of 1700°C within 20 – 30 minutes. The obtained mass is cooled to a temperature not above 100°C, crushed, and mixed with the required quantity of aluminium oxide (10–48 percent by weight). The obtained mixture is melted again in the furnace under the same conditions. The catalyst mass is cooled to a temperature not above 40°C, for example, to the ambient temperature, crushed, and the fraction, having the required particle size of 3–15 mm, is separated. The catalyst dust is returned back into the furnace to join with a new batch.

For a better understanding of the invention, the following examples of its practical embodiment are given by way of illustration.

EXAMPLE 1

First, a catalyst of the following composition (in percent by weight) is prepared:

| | |
|---|---|
| iron oxides | 75.8 |
| aluminium oxide | 22 |
| calcium oxide | 1.35 |
| silicon dioxide | 0.35 |
| potassium oxide | 0.5 |

The procedure is as follows: 75.8 g of iron oxide (magnetite), 1.35 g of calcium oxide, 0.35 g of silicon dioxide, and 0.5 g of potassium oxide are mixed in a ball mill. The mixture is melted at a temperature of 1600°–1700°C for 20–30 minutes, crushed, and mixed with 22 g of aluminium oxide. The new mixture is melted again at a temperature of 1600° – 1700°C for 20 – 30 minutes, the obtained catalyst mass is cooled to a temperature of 20° – 30°C, and crushed to a particle size of 3 – 15 mm.

Specimens of the thus-obtained catalyst are tested in a method for dissociation of ammonia under a pressure of 0.3 kg/sq.cm., at a volumetric velocity of gaseous ammonia of 10,000 hour$^{-1}$, and at a temperature from 800° to 950°C. The temperature of the gaseous ammonia at the entrance into the reactor is 500° C. Ammonia content of nitrogen-hydrogen mixture is determined at the exit from the reactor, and as Table 1 shows, it does not exceed 0.017 – 0.035 percent by volume.

Table 1

| Dissociation temperature, °C | 800 | 850 | 900 | 950 |
|---|---|---|---|---|
| Residual ammonia, % by vol. | 0.035 | 0.03 | 0.025 | 0.017 |

EXAMPLE 2

The catalyst having the following composition (in percent by weight) is first prepared:

| | |
|---|---|
| iron oxides | 63.8 |
| aluminium oxide | 34 |
| calcium oxide | 1.35 |
| silicon dioxide | 0.35 |
| potassium oxide | 0.5 |

The catalyst is prepared as follows: 63.8 g of iron oxides (magnetite), 1.35 g of calcium oxide, 0.35 g of silicon dioxide and 0.5 g of potassium oxide are mixed in a ball mill.

The further procedure for preparing the catalyst and its testing is the same as described in Example 1.

The volumetric velocity of gaseous ammonia is 500 hour$^{-1}$, the pressure, 0.3 kg/sq.cm, and the temperature of the gaseous ammonia at the inlet of the reactor is 500°C. The temperature of the dissociation and the corresponding residual quantities of ammonia contained in the nitrogen-hydrogen mixtures emerging from the reactor are given in Table 2.

Table 2

| Dissociation temperature, °C | 500 | 600 | 650 | 700 | 800 | 850 | 900 | 950 |
|---|---|---|---|---|---|---|---|---|
| Residual ammonia, % by vol. | 0.1 | 0.09 | 0.045 | 0.035 | 0.02 | 0.020 | 0.018 | 0.017 |

EXAMPLE 3

A catalyst having the following composition (in percent by weight) is first prepared:

| | |
|---|---|
| iron oxides | 52.6 |
| aluminium oxide | 45 |
| calcium oxide | 1.4 |
| silicon dioxide | 0.4 |
| potassium oxide | 0.6 |

The catalyst is prepared as follows: 52.6 g of iron oxides, 1.4 g of calcium oxide, 0.4 g of silicon dioxide, and 0.6 g of potassium oxide are mixed in a ball mill.

The further procedure for preparing and testing the catalyst is the same as described in Example 1.

The volumetric velocity of the gaseous ammonia is 1000 hour$^{-1}$, the pressure is 0.3 kg/sq.cm, and the temperature of the gaseous ammonia at the inlet of the reactor is 500°C. The temperatures of the dissociation processes and the corresponding quantities of residual ammonia in nitrogen-hydrogen mixture are given in Table 3.

Table 3

| Dissociation temperature, °C | 600 | 650 | 700 | 800 | 850 | 900 | 950 |
|---|---|---|---|---|---|---|---|
| Residual ammonia, % by vol. | 0.095 | 0.056 | 0.038 | 0.023 | 0.020 | 0.017 | 0.017 |

EXAMPLE 4

A catalyst having the following composition (in percent by weight) is first prepared:

| | |
|---|---|
| iron oxides | 85 |
| aluminium oxide | 12 |
| calcium oxide | 2 |
| silicon dioxide | 0.4 |
| potassium oxide | 0.6 |

The catalyst is prepared by mixing in a ball mill 85 g of iron oxides, 2 g of calcium oxide, 0.4 g of silicon dioxide, and 0.6 g of potassium oxide. The prepared mixture is melted at a temperature of 1600° – 1700°C for 20 – 30 minutes, then cooled to a temperature of 40°–50°C, crushed, and mixed with 12 g of aluminium oxide.

The further procedure for preparing and testing the catalyst is the same as described in Example 1.

The volumetric velocity of a gaseous ammonia is 300000 hour$^{-1}$, the pressure is 0.3 kg/sq.cm and the temperature of the gaseous ammonia at the inlet of the reactor is 500°C. The dissociation temperatures and the corresponding quantities of residual ammonia in the nitrogen-hydrogen mixture emerging from the reactor are given in Table 4.

Table 4

| Dissociation temperature, °C | 800 | 850 | 900 | 950 |
|---|---|---|---|---|
| Residual ammonia, % by volume | 0.08 | 0.055 | 0.05 | 0.05 |

What we claim is:

1. A catalyst for dissociation of ammonia consisting of oxides of iron, aluminium oxide, calcium oxide, silicon dioxide, and magnesium oxide, said components being present in the catalyst in the following quantities, in percent by weight:

| | |
|---|---|
| iron oxides | 85 – 52.6 |
| aluminium oxide | 12 – 45 |
| calcium oxide | 1.35 – 2 |
| silicon dioxide | 0.35 – 0.4 |
| potassium oxide | 0.5 – 0.6. |

2. A method for preparing a catalyst for dissociation of ammonia consisting of oxides of iron, aluminium oxide, calcium oxide, silicon dioxide, and potassium oxide in the following quantities in percent by weight:

| | |
|---|---|
| iron oxides | 85 – 52.6 |
| aluminium oxide | 12 – 45 |
| calcium oxide | 1.35 – 2 |
| silicon dioxide | 0.35 – 0.4 |
| potassium oxide | 0.5 – 0.6 | consisting in mixing 85 – 52.6 percent by weight of iron oxides, 1.35–2 percent by weight of calcium oxide, 0.35 – 0.40 percent by weight of silicon dioxide and 0.5 – 0.6 percent by weight of potassium oxide, melting the obtained mixture at a temperature of 1600°–1700°C with subsequent cooling to a temperature not above 100°C; crushing the cooled mass and then mixing the crushed mass with 12–45 percent by weight of aluminium oxide; melting the obtained mixture at a temperature of 1600–1700°C with subsequent cooling to a temperature not above 40°C; and finally crushing the obtained cooled mass.

\* \* \* \* \*